(12) United States Patent
Thacher et al.

(10) Patent No.: US 8,295,979 B2
(45) Date of Patent: Oct. 23, 2012

(54) ADAPTIVE SCHEDULING OF A SERVICE ROBOT

(75) Inventors: Russell Thacher, Fort Mill, SC (US); Kirk Eisenbeis, Charlotte, NC (US); David August Johnson, Charlotte, NC (US); Noel Wayne Anderson, Fargo, ND (US); Joshua D. Hoffman, Davenport, IA (US)

(73) Assignee: Deere & Company, Moline, IL (US)

( * ) Notice: Subject to any disclaimer, the term of this patent is extended or adjusted under 35 U.S.C. 154(b) by 324 days.

(21) Appl. No.: 12/683,205

(22) Filed: Jan. 6, 2010

(65) Prior Publication Data

US 2011/0166701 A1 Jul. 7, 2011

(51) Int. Cl.
G05B 19/18 (2006.01)

(52) U.S. Cl. ........ 700/250; 700/245; 700/258; 700/259; 700/284; 701/23; 701/25; 701/26; 318/568.1; 318/568.12

(58) Field of Classification Search .......................... None
See application file for complete search history.

(56) References Cited

U.S. PATENT DOCUMENTS

| | | | |
|---|---|---|---|
| 2,751,030 A | 6/1956 | Null | |
| 3,425,197 A | 2/1969 | Kita | |
| 3,924,389 A | 12/1975 | Kita | |
| 4,133,404 A | 1/1979 | Griffin | |
| 4,184,559 A | 1/1980 | Rass | |
| 4,573,547 A | 3/1986 | Yoshimura et al. | |
| 4,777,785 A | 10/1988 | Rafaels | |
| 4,887,415 A | 12/1989 | Martin | |
| 5,246,164 A | 9/1993 | McCann et al. | |
| 5,528,888 A | 6/1996 | Miyamoto et al. | |
| 6,339,735 B1 * | 1/2002 | Peless et al. | ..................... 701/23 |
| 6,443,509 B1 * | 9/2002 | Levin et al. | ....................... 293/4 |
| 6,880,291 B2 | 4/2005 | Raun et al. | |
| 6,947,811 B2 * | 9/2005 | Addink et al. | ................ 700/284 |
| 7,103,451 B2 | 9/2006 | Seal et al. | |

(Continued)

FOREIGN PATENT DOCUMENTS

| | | |
|---|---|---|
| DE | 10349324 A1 | 5/2005 |
| EP | 1647175 A1 | 4/2006 |
| EP | 1933467 | 6/2008 |

(Continued)

OTHER PUBLICATIONS

"Military R-Gator", John Deere Federal & Military Sales, 1 page, retrieved Oct. 16, 2009 www.deere.com/en_US/contractsales/fedmilitarysales/cce/r_gator/r_gator.html.

(Continued)

*Primary Examiner* — Khoi Tran
*Assistant Examiner* — Jonathan L Sample
(74) *Attorney, Agent, or Firm* — Yee & Associates, P.C.; Jeremy J. Westlake

(57) ABSTRACT

A method for scheduling mowing tasks by a robotic mower is provided. An estimated height of grass cut by the robotic mower is determined for a predetermined number of past mowing tasks. The estimated height of grass cut is compared with a predicted height of grass in an operating environment for the robotic mower. Then, a mowing schedule for the robotic mower is adjusted by decreasing a time between mowing tasks in response to the estimated height of grass cut being greater than the predicted height of grass. Alternatively, the mowing schedule for the robotic mower is adjusted by increasing the time between mowing tasks in response to the estimated height of grass cut being less than the predicted height of grass.

20 Claims, 6 Drawing Sheets

U.S. PATENT DOCUMENTS

| | | | |
|---|---|---|---|
| 7,107,132 B2 * | 9/2006 | Dean | 701/23 |
| 7,133,746 B2 * | 11/2006 | Abramson et al. | 700/259 |
| 7,574,284 B2 * | 8/2009 | Goldberg et al. | 700/284 |
| 2007/0188605 A1 | 8/2007 | Anderson et al. | |
| 2008/0109126 A1 * | 5/2008 | Sandin et al. | 701/23 |
| 2008/0183349 A1 * | 7/2008 | Abramson et al. | 701/23 |
| 2011/0153338 A1 * | 6/2011 | Anderson | 705/1.1 |
| 2011/0166715 A1 | 7/2011 | Hoffman et al. | |

FOREIGN PATENT DOCUMENTS

| | | | |
|---|---|---|---|
| WO | WO0170009 | * | 9/2001 |
| WO | 2009/153304 | | 12/2009 |

OTHER PUBLICATIONS

"Robomow Robotic Mower", YouTube—Robomow Robotic Mower, 1 page, retrieved Oct. 16, 2009 www.youtube.com/watch?v=aI7OuvxAIRs.

"iRobot Roomba 560 official video demo", YouTube, 1 page, retrieved Oct. 16, 2009 www.youtube.com/watch?v=CLIPLiQDIk0.

"Unloading on the go with AutoTrac", You Tube, 1 page, retrieved Oct. 16, 2009 www.youtube.com/watch?v=et4cIJ4vtdw.

"LawnBott LB3500 Lawn Mower Review", pp. 1-12, retrieved Nov. 30, 2009 www.lawnbottreview.com/LawnBott_LB3500_Review.html.

"LawnBott LB3250", pp. 1-3, retrieved Nov. 13, 2009 www.robolawn.ca/lawnbott-lb3250-super-robot-lawn-mower.cfm.

European Search Report, Apr. 12, 2011, 5 Pages.

U.S. Appl. No. 12/683,123, filed Jan. 6, 2010, Hoffman et al.

European Search Report dated Apr. 12, 2011, regarding European Application No. 10195362.8, 5 pages.

Sanchez et al., "Fusing 3D Information for Crop/Weeds Classification," 15th International Conference on Pattern Recognition, 4:295-298, Aug. 6, 2002. (Abstract only).

* cited by examiner

US 8,295,979 B2

ADAPTIVE SCHEDULING OF A SERVICE ROBOT

The present application is related to U.S. patent application Ser. No. 12/683,123 entitled Varying Irrigation Scheduling Based on Height of Vegetation filed on Jan. 6, 2010 and assigned to the assignee of the present application, the details of which are incorporated herein by reference.

FIELD OF THE INVENTION

The present invention relates generally to a mobile service robot and more particularly to a method and system for adaptive task scheduling of a mobile service robot.

BACKGROUND OF THE INVENTION

Today, lawn mowing and floor vacuuming are considered by many to be two of the most boring and tiring routine household tasks. As a result, several mobile robotic devices have now been invented for automatically mowing lawns and vacuuming floors to save people time and effort. Mobile robotics is a broad field and many mobile robotic systems have been developed, such as automated guided vehicles for use in structured environments and self-guided vehicles for use in more unstructured environments. Navigation, obstacle avoidance, and motion control are some of the key functional components needed for safe, reliable, and accurate operation of these mobile robotic units. Typically, these mobile robots are fully automatic, battery-powered units that automatically return and connect to a charger when finished with task performance or when the battery charge is low.

SUMMARY

An embodiment of the present invention provides a method for scheduling mowing tasks by a robotic mower. An estimated height of grass cut by the robotic mower is determined for a predetermined number of past mowing tasks. The estimated height of grass cut is compared with a predicted height of grass in an operating environment for the robotic mower. Then, a mowing schedule for the robotic mower is adjusted by decreasing a time between mowing tasks in response to the estimated height of grass cut being greater than the predicted height of grass. Alternatively, the mowing schedule for the robotic mower is adjusted by increasing the time between mowing tasks in response to the estimated height of grass cut being less than the predicted height of grass.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
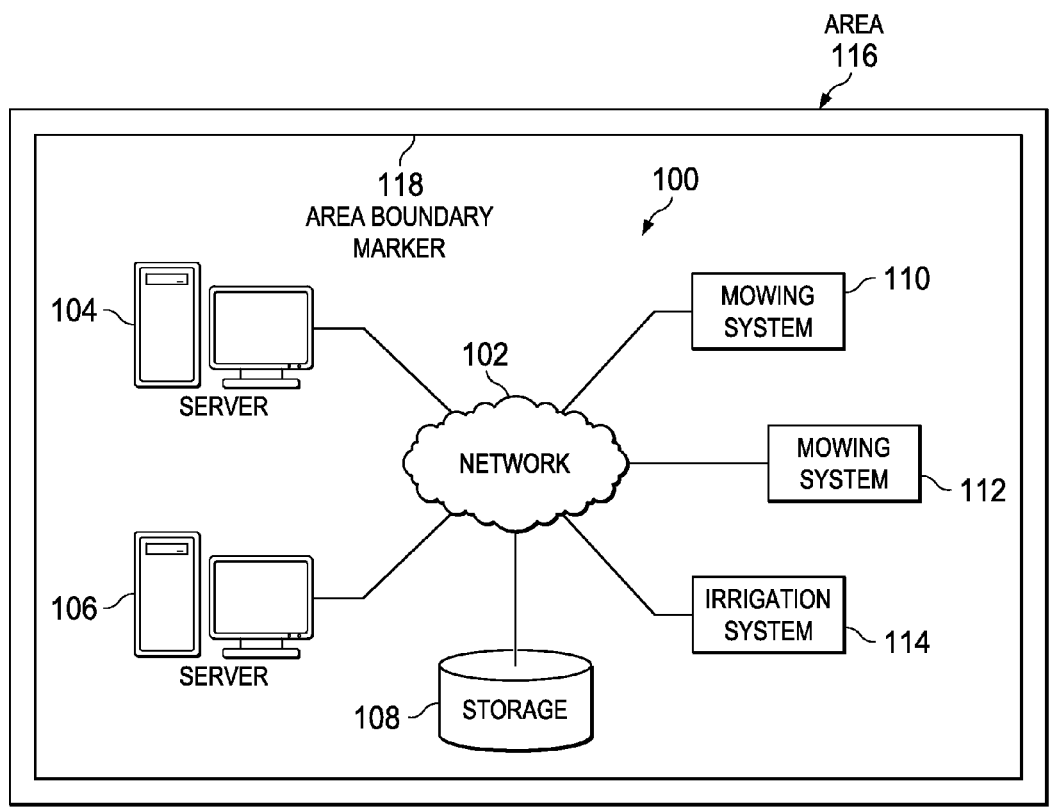
FIG. 1 is a pictorial representation of a network of data processing systems in which an illustrative embodiment may be implemented.

Illustrative embodiments of the present invention provide systems and methods for adaptive task scheduling of a service robot. Field robots are a superset of mobile teleoperated, supervised, and fully autonomous robots of all sizes. Service robots are smaller field robots, such as robotic lawn mowers and vacuum cleaners. These field robotic or autonomous systems, sometimes referred to as mobile robotic platforms, generally have a robotic control system that controls the operational systems of the device.

Sensor inputs to the robotic control system may include data associated with the platform's destination, preprogrammed path information, and detected obstacle information. Based on such data associated with the information above, the mobile robotic platform's movements are controlled. Obstacle detection systems within a platform may, for example, use a camera or cameras to capture images over the broad field of view, or of a particular spectrum within the field of view. For obstacle detection applications of a service robot, the response time for collecting image data should be rapid over a wide field of view to facilitate early recognition and avoidance of obstacles.

In addition, these mobile robotic platforms also include a locomotion system, a power system, a task payload system, such as a cutting unit for lawn mowing, and a path planning system. Path planning may include point-to-point planning or area coverage planning. Area coverage may be random coverage of an area by the service robot over a predetermined period of time or may be precise area coverage with localization. Localization perception or location sensing devices for service robots may, for example, include compasses, odometers, global positioning system receivers, and vision-based triangulation systems. Further, these mobile robotic platforms also include perception for safeguarding to prevent damage to the service robot, itself, or other objects that may be present in the operating environment.

Current outdoor service robots, such as robotic lawn mowers, are configured to operate according to a manually-specified time schedule. However, during different seasons of the year or under different environmental conditions, for peak efficiency of the outdoor service robots it is necessary the user to manually modify this time schedule. Additionally, it is difficult to accurately estimate the time required for outdoor service robots to accomplish their tasks completely, which results in the user purposely over scheduling the service robot. Consequently, the service robots may experience subsequent efficiency losses and increased wear and tear.

Illustrative embodiments to overcome these scheduling shortcomings of current outdoor service robots utilize load profiling and environmental profiling. Load profiling is the continuous monitoring by the service robot of the grass quantity. The grass quantity is correlated to the height of grass stems and to the spatial density of the grass stems. Grass height sensors are a means of detecting the height of the grass stems and structured light sensors are a means of measuring the spatial density of the grass stems.

However, given the challenges and added cost of directly measuring grass height and/or spatial density, it is desirable to indirectly measure grass quantity using an inexpensive and reliable sensor. Thus, illustrative embodiments utilize sensors related to the service robot mower. Specifically, illustrative embodiments may use sensors to measure mower power, such as battery voltage or motor current. In addition, illustrative embodiments may use sensors for other measurable parameters, such as axle torque. From these mower related sensors, the grass quantity (i.e., the grass height and/or spatial density) can be inferred.

Environmental profiling is the continuous monitoring of environmental conditions or factors, such as rainfall, temperature, wind speed, sunlight, and soil moisture. Monitoring of these environmental conditions may either be performed directly by utilizing sensors located on the service robot and/or the charging station to collect this environmental data or indirectly by using a network connection, such as an Internet connection, to collect this environmental data from a weather service for example. When the service robot determines that environmental conditions are favorable for increased grass growth, the service robot may automatically increase the mowing schedule to account for the environmental conditions. Conversely, the service robot may automatically reduce the mowing schedule during periods of low grass growth conditions. Additionally, the service robot may use weather monitoring to reschedule or skip one or more mowing sessions in the event of adverse conditions, such as heavy rainfall amounts, using either actual or predicted environmental conditions.

Further, along the lines of environmental profiling, the mowing system may by cognizant of an irrigation system schedule and adjust the mowing schedule in response to homeowner changes to the lawn watering schedule. This awareness reduces the demand for the user to manually adjust the mowing system schedule after every adjustment to the irrigation system schedule, which may be frequent during the summer as the homeowner gauges watering needs by the color of the grass and, potentially, by wet spots in the yard. Coupling the mowing and watering schedules may also ensure that the service robot mower operates at some interval following irrigation to allow the grass to dry and therefore reduce mower load.

Thus, illustrative embodiments are capable of monitoring grass growth to automatically and adaptively adjust the mowing schedule. The mowing schedule adjustments are based on the measured grass density, which is based, for example, on determining the power drawn by the service robot mower during mowing sessions and a standard grass growth model. As the power drawn by the service robot mower drops off, the time between mowing operations may be extended. In addition, as the power drawn by the service robot mower mounts up, the time between mowing operations may be shortened.

Figure 2:
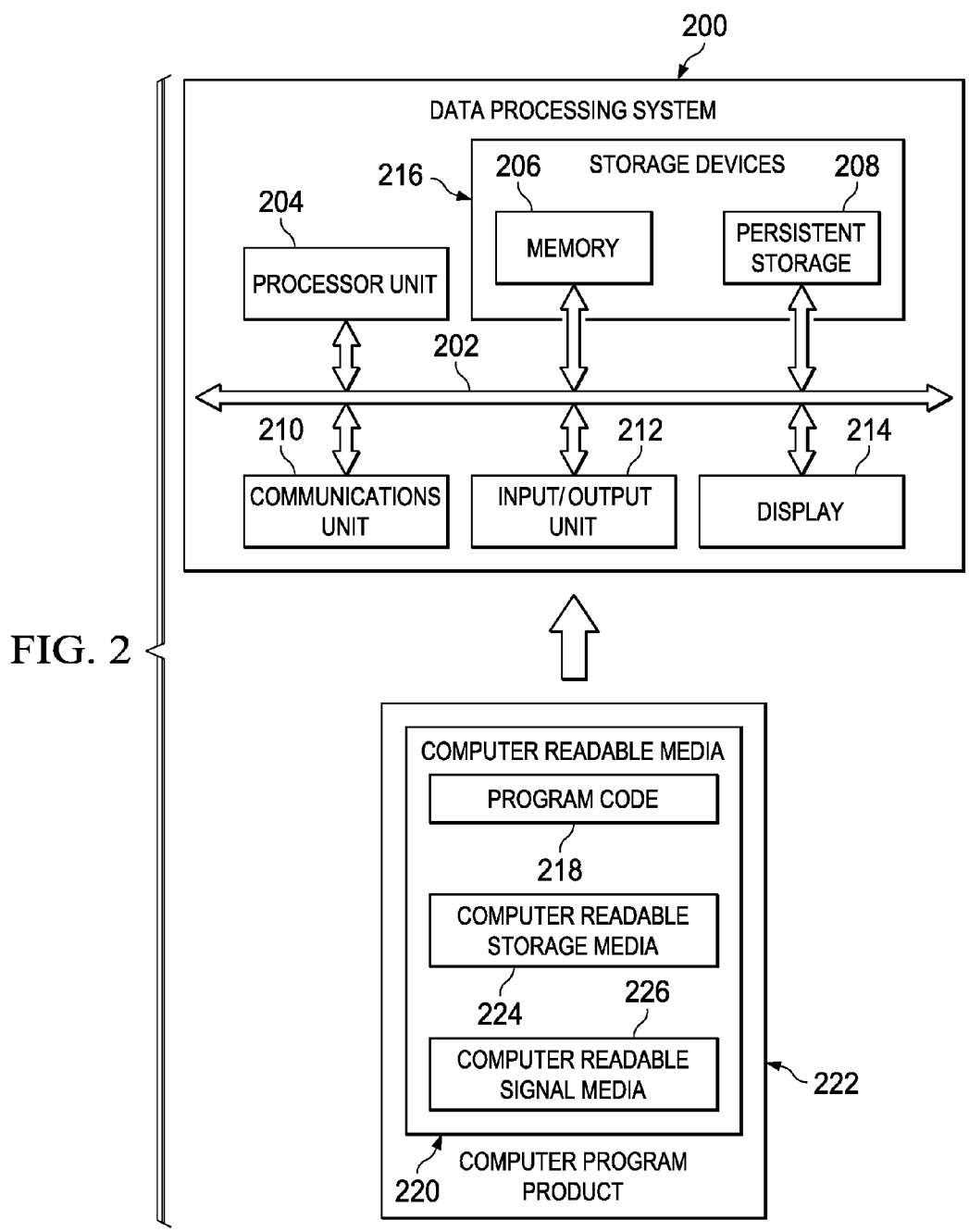
FIG. 2 is a block diagram of a data processing system in which an illustrative embodiment may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of data processing systems and other devices in which the illustrative embodiments may be implemented. Network data processing system 100 contains network 102, which is the medium used to provide communications links between various data processing systems and other devices connected together within network data processing system 100. Network 102 may include connections, such as wire, wireless communication links, or fiber optic cables.

In the depicted example, server 104 and server 106 connect to network 102 along with storage unit 108. In addition, mowing system 110, mowing system 112, and irrigation system 114 also connect to network 102. Mowing system 110, mowing system 112, and irrigation system 114 are clients to server 104 and/or server 106 in this example.

In the depicted example, server 104 provides information, such as boot files, operating system images, and applications to mowing system 110, mowing system 112, and irrigation system 114. Server 104 may, for example, represent a local server that is located in a smart house. Server 106 may, for example, represent a remote server that is located at a service robot mower manufacturing site or a weather service site. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to mowing system 110 over network 102 for use on mowing system 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

Mowing systems 110 and 112 are data processing systems that include mobile service robot mowers for performing automatic robotic mowing tasks or services in area 116. Mowing system 110 and mowing system 112 each may include one or more mobile service robot mowers and their associated charging stations or battery chargers. In addition, even though this illustrative example illustrates two mowing systems, illustrative embodiments are not restricted to such. In other words, illustrative embodiments may include more or fewer mowing systems to provide robotic mowing services for area 116.

Irrigation system 114 is a data processing system that includes irrigation components for automatically watering area 116. Area 116 may, for example, be one or more residential lots, commercial lots, golf courses, parks, fields, or any other area of residential, commercial, recreational, or amenity land planted with grass. Area 116 may, for example, include one or more structures, such as houses, commercial buildings, storage sheds, and recreational equipment, and one or more parking areas, driveways, and sidewalks. Area 116 may be contiguous or non-contiguous.

In one illustrative embodiment, the grass in area 116 may be maintained at a low, even height. In another illustrative embodiment, the grass in area 116 may be maintained at different even heights. In addition, the grass in area 116 may include any species of grass or turf.

Area boundary marker 118 marks the boundaries of area 116 for mowing systems 110 and 112. Mowing systems 110 and 112 use area boundary marker 118 to identify which portion(s) of area 116 are to be mowed. Area boundary marker 118 may, for example, be an electrical wire or an optical demarcation of the boundary. Even though area boundary marker 118 is shown as a single marker in this exemplary illustration, area boundary marker 118 may include a plurality of markers. In addition, even though area boundary marker 118 is shown as having a square configuration, a user may form area boundary marker 118 in any shape or configuration necessary.

FIG. 1 is only intended as an example, and not as an architectural limitation for the different illustrative embodiments.

With reference now to FIG. 2, a block diagram of a data processing system is depicted in which an illustrative embodiment may be implemented. Data processing system 200 is an example of a data processing system, such as server 104 or mowing system 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
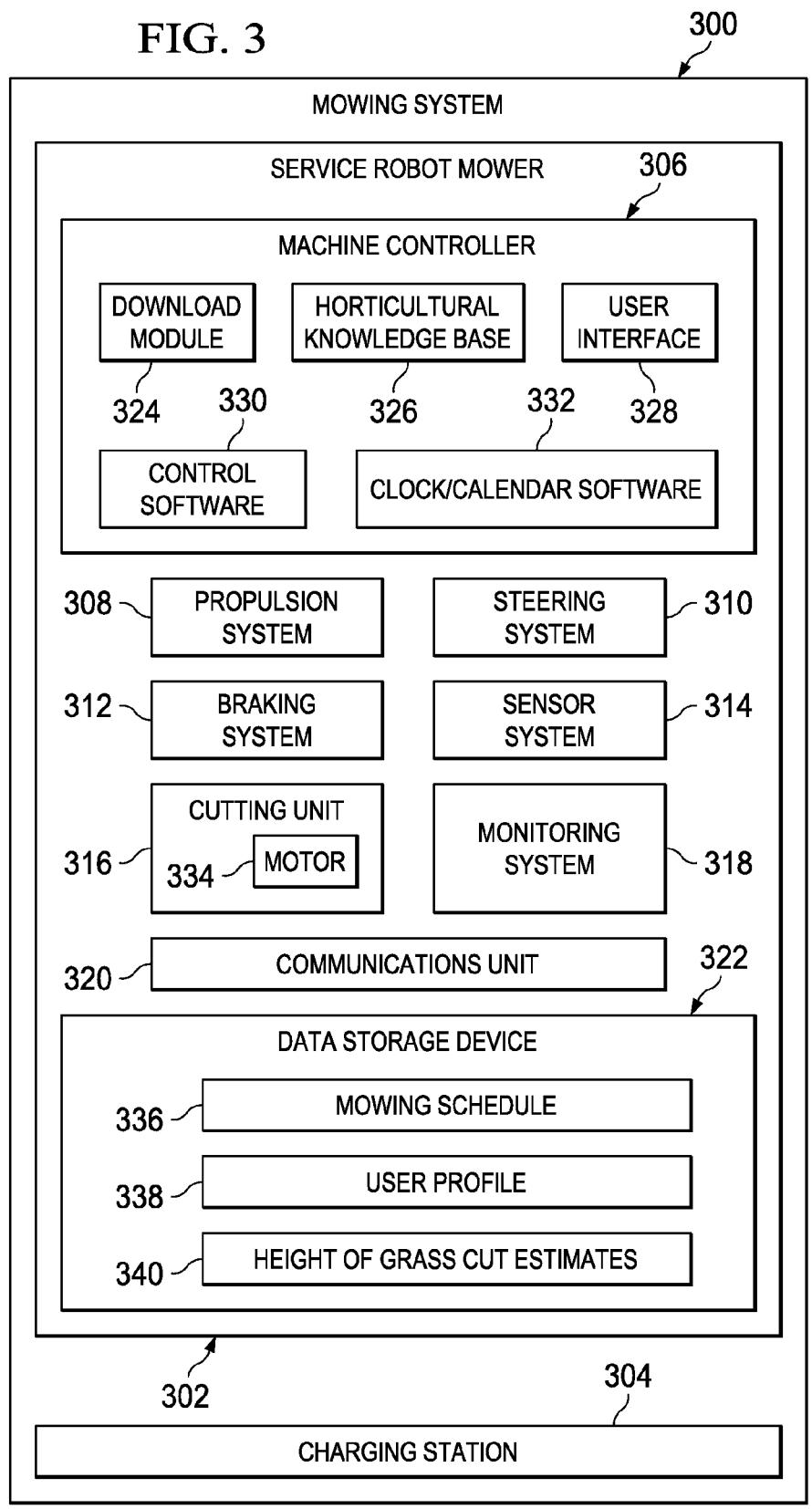
FIG. 3 is a block diagram of a mowing system in accordance with an illustrative embodiment.

With reference now to FIG. 3, a block diagram of mowing system is depicted in accordance with an illustrative embodiment. Mowing system 300 may, for example, be mowing system 110 or mowing system 112 in FIG. 1. However, it should be noted that mowing system 300 is only intended as an example of one possible implementation of a mowing system.

As illustrated, mowing system 300 includes service robot mower 302 and charging station 304. However, it should be noted that mowing system 300 may include a plurality of service robot mowers and charging stations. Service robot mower 302 is a mobile service robot that is configured to automatically and autonomously mow one or more designated areas, such as area 116 in FIG. 1. The one or more designated areas may, for example, be lawns, fields, golf courses, and/or other similar types of grassy areas. Also, the one or more designated areas are marked or defined by one or more markers, such as area boundary marker 118 in FIG. 1, which identify the desired areas to be mowed by service robot mower 302.

Charging station 304 is a base or docking station for service robot mower 302. Service robot mower 302 uses charging station 304 to recharge its power source. The power source for service robot mower 302 may, for example, be one or more rechargeable batteries. However, it should be noted that service robot mower 302 may utilize any type of rechargeable or refuelable power source for powering its various components and systems. Service robot mower 302 docks with charging station 304 or the fueling station when service robot mower 302 completes a scheduled mowing task. In addition, service robot mower 302 may dock with charging station 304 to recharge or refuel its power source as needed while performing a mowing task.

Service robot mower 302 includes machine controller 306, propulsion system 308, steering system 310, braking system 312, sensor system 314, cutting unit 316, monitoring system 318, communications unit 320, and data storage device 322. Machine controller 306 includes download module 324, horticultural knowledge base 326, user interface 328, control software 330, and clock/calendar software 332. Machine controller 306 may, for example, be a data processing system, such as data processing system 200 in FIG. 2, or some other device that may execute instructions or processes to control functions of service robot mower 302. Thus, machine controller 302 may be a computer, an application integrated specific circuit, and/or some other suitable device. In addition, different types of devices and systems may be used to provide redundancy and fault tolerance.

Machine controller 306 may execute processes using control software 330 to control propulsion system 308, steering system 310, braking system 312, and sensor system 314, which direct movement of service robot mower 302 in the operating environment. Also, machine controller 306 may execute processes using control software 330 to control cutting unit 316, which performs the task of cutting or mowing the grass growing in the designated areas. Cutting unit 316 includes motor 334, which drives one or more cutting devices. Motor 334 may represent one motor or a plurality of motors.

Furthermore, machine controller 306 may execute processes using control software 330 to control monitoring system 318, which monitors the power usage of motor 334 during each mowing task over time. Machine controller 306 may use this power usage data to adaptively adjust scheduling of mowing tasks based on the grass quantity or density. The grass density may be determined by the amount of power drawn by motor 334 during each mowing task and a known grass growth model.

For example, a manufacturer or a research group may determine that for a particular motor, X amount of power usage is required to cut five millimeters of a particular grass type, Y amount of power usage is required to cut ten millimeters, Z amount of power usage to cut fifteen millimeters, and so on. A manufacturer may, for example, load these calculated power usage values in the storage device at the time of manufacture or updated power usage calculations may be downloaded from a server, such as server 104 in FIG. 1. However, it should be noted that measuring power usage is only but one means of determining the grass quantity.

Machine controller 306 may send various commands to these components to operate service mower robot 302 in different modes of operation. These commands may take various forms depending on the implementation. For example, the commands may be analog electrical signals in which a voltage and/or current change is used to control these systems. In other implementations, the commands may take the form of data sent to the systems to initiate the desired functions or actions.

Download module 324 provides for online updates of horticultural knowledge base 326 by a network server, such as server 106 in FIG. 1. The network server may be a local network server or remote network server. In addition, download module 324 may also provide for online updates of current and future environmental data or factors from one or more local, regional, and national weather services.

Horticultural knowledge base 326 contains information about the operating environment, such as, for example, a geo-referenced map showing the landscape, structures, tree locations, flowerbed locations, individual plant locations, driveway locations, sidewalk locations, and other static object locations, such as pools, ponds, and recreational equipment.

In addition, horticultural knowledge base 326 may also contain information, such as, without limitation, grass species located in the operating environment; information about water requirements, growth stages, and life cycles of the grass species located in the operating environment; current weather for the operating environment; weather history for the operating environment; specific environmental features of the operating environment that affect service robot mower 302; and the like. It should be noted that horticultural knowledge base 326 may be located entirely in service robot mower 302 or parts or all of horticultural knowledge base 326 may be located in a remote location, such as storage 108 in FIG. 1, which service robot mower 302 may access via communications unit 320.

User interface 328 may, in one illustrative embodiment, be implemented in a display device, which is mounted on service robot mower 302 and viewable by a user. User interface 328 may, for example, display sensor data obtained from sensor system 314 regarding the operating environment surrounding service robot mower 302, as well as messages, alerts, and queries for the user. In other illustrative embodiments, user interface 328 may be implemented in a remote display device held by the user or may be implemented in a remote data processing system, such as server 104 in FIG. 1, which may be located in a smart house.

Clock/calendar software 332 is a software application that provides time and date information. In addition, clock/calendar software 332 is capable of receiving user inputs regarding scheduled appointments, activities, events, and the like. Machine controller 306 may utilize clock/calendar software 332 to factor in regular user behavioral patterns, such as the user's known work schedule, when adjusting or modifying mowing schedule 336. The user's work schedule may be obtained from entries in the electronic calendar. Moreover, machine controller 306 may also utilize clock/calendar software 332 to factor in potential times when the yard will be in use, such as, for example, weekends, evenings, and holidays. Thus, mowing schedule 336 may be tailored to the most likely times the homeowner is away so that service robot mower 302, in essence, operates behind the scenes. Furthermore, machine controller 306 may use clock/calendar software 332 to determine when to send power up commands to service robot mower 302 based on mowing schedule 336, to determine seasons of the year for known grass growing models, and to determine when to adjust mowing schedule 336.

In these examples, propulsion system 308 propels or moves service robot mower 302 in response to commands from machine controller 306. Propulsion system 308 may maintain or increase the speed at which service robot mower 302 moves in response to instructions received from machine controller 306. Propulsion system 308 may be an electrically controlled propulsion system. In addition, propulsion system 304 may, for example, be an internal combustion engine, an internal combustion engine/electric hybrid system, an electric engine, or some other suitable propulsion system.

Steering system 310 controls the direction or steering of service robot mower 302 in response to commands received from machine controller 306. Steering system 310 may, for example, be an electrically controlled hydraulic steering system, an electrically driven rack and pinion steering system, an Ackerman steering system, a skid-steer steering system, a differential steering system, or some other suitable steering system.

Braking system 312 slows down and/or stops service robot mower 302 in response to commands from machine controller 306. Braking system 312 may be an electrically controlled braking system. In addition, braking system 312 may, for example, be a hydraulic braking system, a friction braking system, or some other suitable braking system that may be electrically controlled.

Sensor system 314 is a high integrity perception system and may be a set of sensors used to collect information about the operating environment around service robot mower 302. In these examples, sensor system 314 sends the collected information to machine controller 306 to provide data for identifying how service robot mower 302 should operate within the environment. For example, sensor system 314 may send data to machine controller 306 regarding the grass quantity within the operating environment. Sensor system 314 may determine the grass height and/or the grass spatial density of the operating environment by using, for example, a grass height sensor and/or a structured light sensor. In these examples, a set refers to one or more items. Thus, a set of sensors is one or more sensors in these examples.

Communication unit 320 is a high integrity communications system and may provide multiple redundant communications links and channels to machine controller 306 in order for machine controller 306 to receive information. The communication links and channels may be heterogeneous and/or homogeneous redundant components that provide fail-safe communication. This received information may, for example, include data, commands, and/or instructions.

Communication unit 320 may take various forms. For example, communication unit 320 may include a wireless communications system, such as a cellular phone system, a wireless fidelity (Wi-Fi) technology system, a Bluetooth wireless technology system, and/or some other suitable wireless communications system. Further, communication unit 320 also may include a communications port, such as, for example, a universal serial bus port, a serial interface, a parallel port interface, a network interface, and/or some other suitable port to provide a physical communications link. Communication unit 320 may be used to communicate with a user or a remote data processing system, such as a server.

Data storage device 322 is one example of persistent storage 208 in FIG. 2. Data storage device 322 includes mowing schedule 336, user profile 338, and height of grass cut estimates 340. Machine controller 306 uses mowing schedule 336 to determine when to send a command to service robot mower 302 to perform a mowing task. Mowing schedule 336 may be a default mowing schedule entered by the manufacturer, a mowing schedule entered by the user via user interface 328, or a modified mowing schedule generated by machine controller 306.

User profile 338 is a file that stores information regarding the user and the user's preferences. User profile 338 may contain data, such as, for example, user name, user security password, the user's work schedule(s), which may be linked to clock/calendar software 332, time preferences for when to perform mowing tasks, and time preferences for when not to perform mowing tasks. Height of grass cut estimates 340 are stored estimate values that represent the height of the grass cut during previous mowing tasks for a predetermined number of times. Monitoring system 318 may indirectly estimate the grass height by monitoring power usage of motor 334 during a mowing task. In one advantageous embodiment, power usage values are dynamically generated by monitoring system 318, stored on data storage device 322, and then saved to a fixed knowledge base for future use by machine controller 306. Alternatively, sensor system 314 may directly estimate the grass height by measuring the height and/or the spatial density of the grass.

The exemplary illustration of mowing system 300 in FIG. 3 is not meant to imply physical or architectural limitations on the manner in which different advantageous embodiments may be implemented. Other components in addition to or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments horticultural knowledge base 326 may be separate and distinct from mowing system 300, but capable of being used by mowing system 300.

Figure 4:
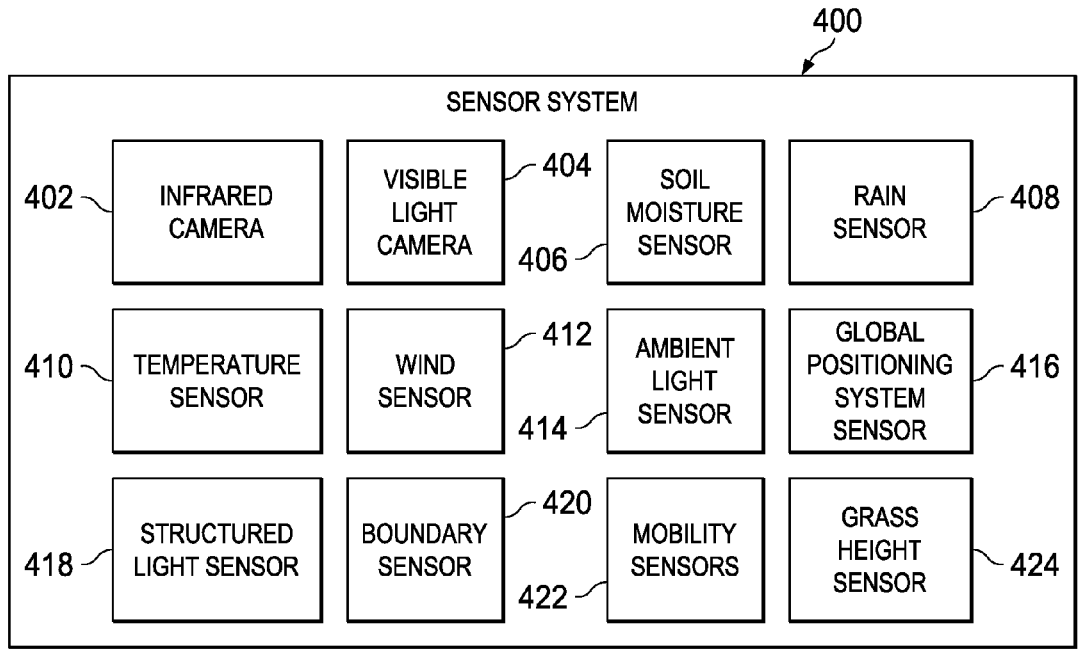
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 314 in FIG. 3.

As illustrated, sensor system 400 includes infrared camera 402, visible light camera 404, soil moisture sensor 406, rain sensor 408, temperature sensor 410, wind sensor 412, ambient light sensor 414, global positioning system (GPS) sensor 416, structured light sensor 418, boundary sensor 420, mobility sensors 422, and grass height sensor 424. A machine controller, such as machine controller 306 in FIG. 3, may use one or more of these different sensors to identify the operating environment around a service robot, such as service robot mower 302 in FIG. 3. The machine controller may select from these different sensors in sensor system 400 such that at least one of these sensors is always capable of sensing information needed to operate the mobile service robot mower in different operating environments.

Infrared camera 402 may form an image using infrared radiation. Thus, infrared camera 402 may detect heat indicative of a living thing versus an inanimate object in the operating environment of the mobile service robot mower. Visible light camera 404 may be a standard still-image camera, which may be used alone for color information or with a second camera to generate stereoscopic, or three-dimensional, images. When visible light camera 404 is used along with a second camera to generate stereoscopic images, the two or more cameras may be set with different exposure settings to provide improved performance over a range of lighting conditions.

Visible light camera 404 may also be a video camera that captures and records images. As a result, visible light camera 404 may be a component in a video-based object recognition system. The video-based object recognition system uses shape recognition to trigger alerts when a target is matched.

One capability provided by video system monitoring of an area, such as area 116 in FIG. 1, is large obstacle detection, which may delay a scheduled mowing task or may adjust the zone to be mowed when new dynamic objects, such as children or pets, enter the area. Further, the video-based object recognition system may be used to verify that the service robot mower is operating in the correct section of the yard when scheduled. Furthermore, infrared images provided by infrared camera 402 and images provided by visible light camera 404 may be processed using means known in the art to identify grass species and assess grass health.

Soil moisture sensor 406 detects the current in situ soil moisture from specific portions of the operating environment. Rain sensor 408 detects precipitation on an exterior surface of the service robot mower. Temperature sensor 410 detects the ambient temperature of the operating environment. Wind sensor 412 detects the wind speed in the operating environment. Ambient light sensor 414 measures the amount of ambient light in the operating environment.

In one illustrative embodiment, one or more of sensors 408-414 may be located on a charging station, such as charging station 304 in FIG. 3, instead of on the service robot mower. Alternatively, one or more of sensors 408-414 may be located separate from both the mobile service robot mower and the charging station, yet near enough to the operating environment so as to provide sufficiently accurate data. In addition, one or more of these sensors, such as temperature sensor 410 and wind sensor 412, may be optional features of sensor system 400. Also, a communications unit, such as communications unit 320 in FIG. 3, may transmit data obtained by one or more of these sensors to an online database, such as storage 108 in FIG. 1.

The mobile service robot mower may use GPS sensor 416 to identify the location of the mobile service robot mower with respect to other objects in the operating environment. GPS sensor 416 may be any type of radio frequency triangulation scheme based on signal strength and/or time. Examples include, without limitation, the Global Positioning System, Glonass, Galileo, and cell phone tower relative signal strength. Position is typically reported as latitude and longitude with an error that depends on factors, such as condition of the ionosphere, satellite constellation, and signal attenuation from vegetation.

Structured light sensor 418 emits light in a pattern, such as one or more lines, reads back the reflections of the light pattern through a camera, and interprets the reflections to detect and measure objects in an operating environment. For example, structured light sensor 418 may measure the grass spatial density within the operating environment, which the mobile service robot mower may use to determine grass quantity. In addition, the mobile service robot mower may use structured light sensor 418 to detect obstacles or objects in the operating environment.

Boundary sensor 420 detects a boundary marker, such as area boundary marker 118 in FIG. 1. The boundary marker may, for example, be a wire placed on or in the soil which marks the boundary of the area to be mowed. The mobile service robot mower uses boundary sensor 420 to alert a machine controller, such as machine controller 306 in FIG. 3, that the service robot mower is exiting or is about to exit the designed mowing area.

Further, boundary sensor 420 may be adapted from the boundary wire detection role to also include a capacitive sensing role capable of measuring soil moisture because the soil dielectric constant changes with water content. This capacitive sensing role may also be capable of detecting non-grass landmarks, such as stepping stones, patios, sidewalks, and the like, for map matching, boundary identification, etc. Moreover, sensor system 400 may transmit this in situ soil moisture data back to a server, such as server 106 in FIG. 1, which may be located in a smart house to assist the server in determining when an irrigation system, such as irrigation system 114 in FIG. 1, is to water the grass in the operating environment.

The mobile service robot mower may use mobility sensors 422 to safely and efficiently guide the mobile service robot mower through the designated mowing area(s). Mobility sensors 422 may, for example, include an odometer, a compass for dead reckoning, vision and ultrasonic sensors for obstacle/object detection, and/or any other suitable sensor.

The mobile service robot mower may use grass height sensor 424 to measure the grass height within the operating environment. The mobile service robot mower may use this grass height data alone, or in conjunction with data obtained from structured light sensor 418, to determine the grass quantity. Grass height sensor 424 may, for example, be a mechanical sensor, an electrical sensor, an optical sensor, or any combination thereof.

Sensor system 400 is a set of sensors that collect data and information about the operating environment around the mobile service robot mower, as well as the condition of the grass in the area to be mowed. In these examples, a set refers to one or more items. Thus, a set of sensors refers to one or more sensors in these examples.

Figure 5:
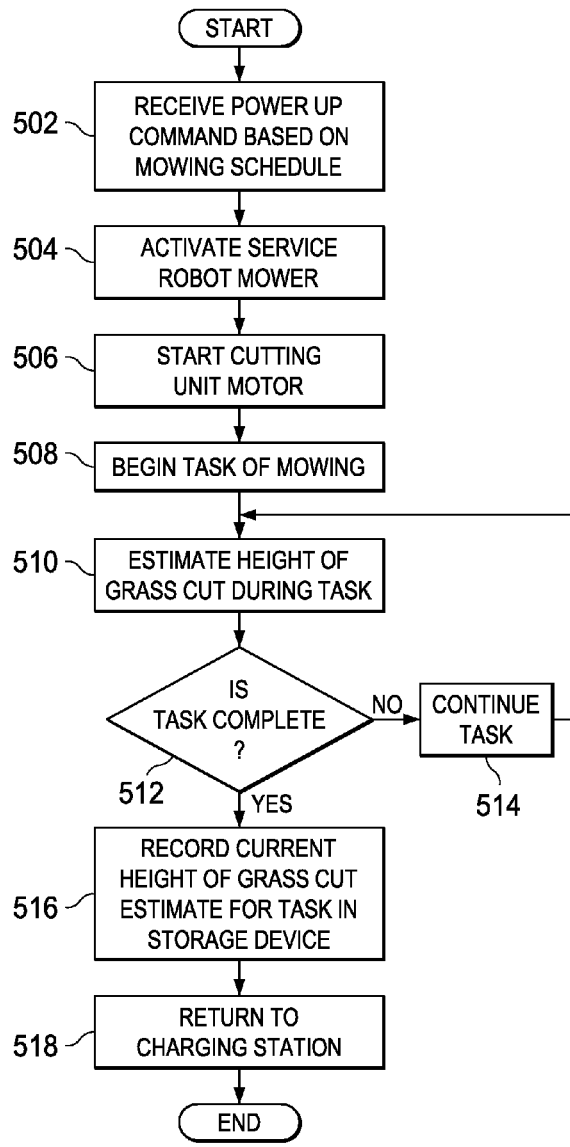
FIG. 5 is a flowchart illustrating an exemplary process for estimating a height of grass cut in accordance with an illustrative embodiment.

With reference now to FIG. 5, a flowchart illustrating an exemplary process for estimating a height of grass cut is shown in accordance with an illustrative embodiment. The process shown in FIG. 5 may be implemented in a mowing system, such as mowing system 300 in FIG. 3.

The process begins when the mowing system receives a power up command based on a mowing schedule, such as mowing schedule 336 in FIG. 3 (step 502). After receiving the power up command in step 502, the mowing system activates a service robot mower, such as service robot mower 302 in FIG. 3 (step 504). Then, the service robot mower starts a cutting unit motor, such as motor 334 in cutting unit 316 in FIG. 3 (step 506). Subsequently, the service robot mower begins a task of mowing a lawn or other type of grassy area, such as area 116 in FIG. 1 (step 508).

In addition, the service robot mower estimates the height of the grass cut during the task of mowing (step 510). The service robot mower may estimate the height of the grass being cut by monitoring the current power usage of the cutting unit motor utilizing a monitoring system, such as monitoring system 318 in FIG. 3. In addition to or instead of using the monitoring system, the service robot mower may estimate the height of the grass or the spatial density of the grass being cut using a sensor system, such as sensor system 400 in FIG. 4. The sensor system may estimate the height and/or spatial density of the grass by using a grass height sensor and/or a structured light sensor, such as grass height sensor 424 and structured light sensor 418 in FIG. 4.

Further, the service robot mower makes a determination as to whether the task is complete (step 512). The service robot mower may determine that the task is complete or that the area is covered by, for example, expiration of a default or learned task time limit or by precise area localization provided by dead reckoning, GPS, and/or visual triangulation.

If the task is not complete, no output of step 512, then the service robot mower continues the task (step 514). Thereafter, the process returns to step 510 where the service robot mower continues to monitor the current power usage of the cutting unit motor. If the task is complete, yes output of step 512, the service robot mower records the current power usage of the cutting unit motor for the task in a storage device, such as data storage device 322 in FIG. 3 (step 516). In addition, the service robot mower returns to a charging station, such as charging station 304 in FIG. 3 (step 518). The process terminates thereafter.

However, it should be noted that the service robot mower may return to the charging station one or more times prior to completion of the task if the service robot mower's battery charge level is approaching a predetermined threshold level. For example, a machine controller, such as machine controller 306 in FIG. 3, may activate return to charging station behavior at twenty-five percent charge remaining in the battery with a target charge remaining at return to the charging station between five and ten percent. If the actual charge remaining upon return to the charging station was less than five percent, say for example three percent, the machine controller may increase the return to charging station behavior activation level to thirty percent from the twenty-five percent level. Also, depending on the randomness of the path taken by the service robot mower to the charging station upon return-to-charging station behavior activation, the service robot mower may filter the actual charge value at the charging station upon return over some predetermined number of returns.

The machine controller utilizes a more sophisticated filtering and adjustment process, which takes into account the statistical distribution of actual remaining charge at return so that the charge upon activation of the return-to-charger behavior is at a level that ensures a set statistical probability, such as, for example, ninety-nine percent, that the service robot mower will make it back to the charging station. Further, the machine controller may use ambient air temperature data to adjust the return-to-charger behavior trigger as ambient air temperature impacts effective battery capacity. The machine controller may use a temperature sensor, such as temperature sensor 410 in FIG. 4, to determine the ambient air temperature during the mowing task. Alternatively, the machine controller may use a download module, such as download module 324 in FIG. 3, to wirelessly download temperature data from an online weather service server via a network, such as network 102 in FIG. 1.

Moreover, the machine controller may also utilize topographic information to adjust the return-to-charger behavior trigger. For example, the service robot mower may use more power going uphill and less power going downhill. The machine controller may utilize a horticultural knowledge base and/or a sensor system, such as horticultural knowledge base 326 and sensor system 314 in FIG. 3, to determine the topographical features in the area currently being mowed.

Figure 6:
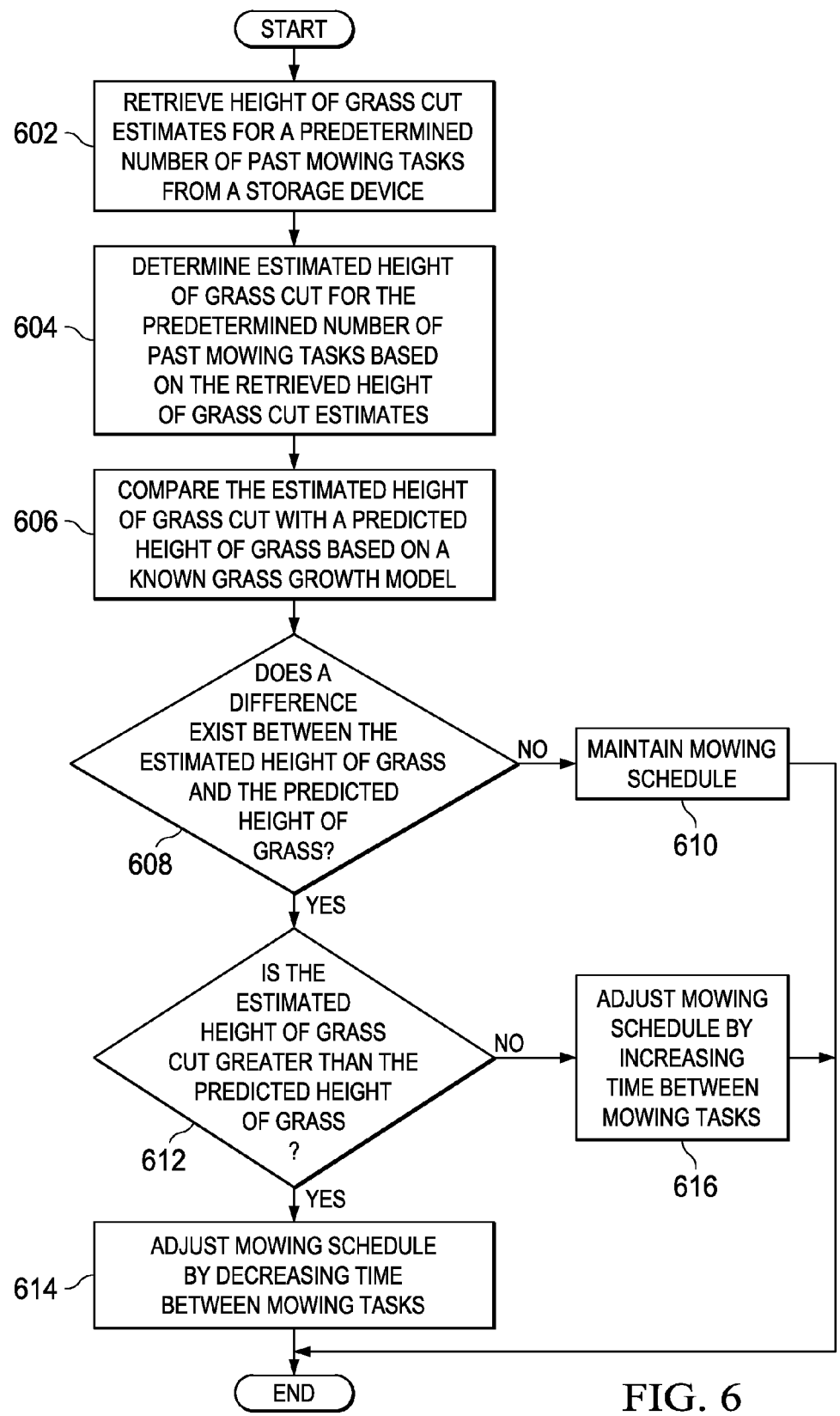
FIG. 6 is a flowchart illustrating an exemplary process for adaptively adjusting a mowing schedule in accordance with an illustrative embodiment.

With reference now to FIG. 6, a flowchart illustrating an exemplary process for adaptively adjusting a mowing schedule is shown in accordance with an illustrative embodiment. The process shown in FIG. 6 may be implemented in a machine controller, such as machine controller 306 in FIG. 3.

The process begins when the machine controller retrieves height of grass cut estimates, such as height of grass cut estimates 340 in FIG. 3, for a predetermined number of past mowing tasks from a storage device, such as data storage device 322 in FIG. 3 (step 602). Then, the machine controller determines an estimated height of grass cut by the robotic mower for the predetermined number of past mowing tasks based on the retrieved height of grass cut estimates (step 604). Afterward, the machine controller compares the estimated height of grass cut with a predicted height of grass in an operating environment for the robotic mower (step 606). The predicted height of grass is a known value that is based on a known grass growth model. In addition, the predicted height of the grass is calculated prior to performing the mowing task.

Subsequently, the machine controller makes a determination as to whether a difference exists between the estimated height of grass cut and the predicted height of the grass (step 608). However, it should be noted that the difference between the estimated height of grass cut and the predicted height of the grass may be within a predetermined acceptable range and not just an exact match. If a difference does not exist between the estimated height of grass cut and the predicted height of the grass, no output of step 608, then the machine controller maintains the mowing schedule (step 610) and the process terminates thereafter.

If a difference does exist between the estimated height of grass cut and the predicted height of the grass, yes output of step 608, then the machine controller makes a determination as to whether the estimated height of grass cut is greater than the predicted height of the grass (step 612). If the estimated height of grass cut is greater than the predicted height of the grass, yes output of step 612, then the machine controller adjusts the mowing schedule, such as mowing schedule 336 in FIG. 3, by decreasing the time between mowing tasks (step 614). The process terminates thereafter.

If the estimated height of grass cut is less than the predicted height of the grass, no output of step 612, then the machine controller adjusts the mowing schedule by increasing the time between mowing tasks (step 616). The process terminates thereafter.

However, it should be noted that adjusting the mowing schedule may also include modifying how long the service robot mows the designated area during an outing in addition to adjusting how often the service robot goes out. In addition, once the service robot establishes how long it takes to cover an area of a particular yard, that value typically is not changed, but the interval between mowing tasks may be adjusted often if necessary.

Thus, the machine controller adaptively and automatically adjusts the mowing schedule over time based on the condition of the grass being cut. However, it should be noted that the adjustment to the mowing schedule may be to the entire area to be mowed or only to a portion of that area. Based on site-specific grass growth estimates, the machine controller may direct the service robot mower to visit areas with likely greatest grass growth first or more frequently. The mowing schedule may at least be partially or wholly derived from a default mowing schedule, current grass quantity data, estimated grass quantity data, and/or historical grass quantity data.

Figure 7:
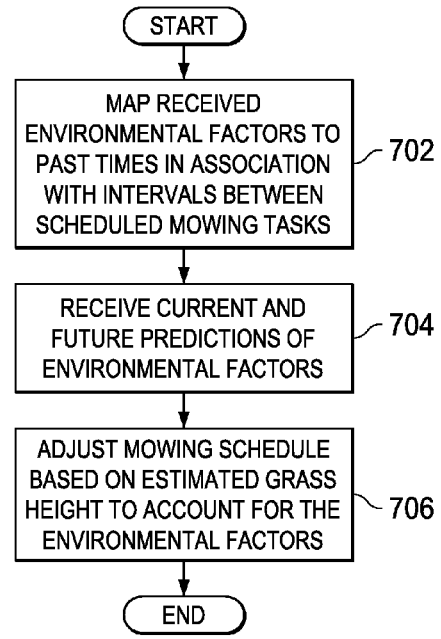
FIG. 7 is a flowchart illustrating an exemplary process for adaptively adjusting a mowing schedule based on estimated grass height to account for environmental factors in accordance with an illustrative embodiment.

With reference now to FIG. 7, a flowchart illustrating an exemplary process for adaptively adjusting a mowing schedule based on estimated grass height to account for environmental factors is shown in accordance with an illustrative embodiment. The process shown in FIG. 7 may be implemented in a machine controller, such as machine controller 306 in FIG. 3.

The process begins when the machine controller maps received environmental factors, such as rainfall amounts and temperature, to past times in association with intervals between scheduled mowing tasks (step 702). In addition, the machine controller receives current and future forecasts of these environmental factors (step 704). Then, the machine controller adjusts a mowing schedule, such as mowing schedule 336 in FIG. 3, based on the estimated grass height to account for these environmental factors (step 706). The process terminates thereafter.

Figure 8:
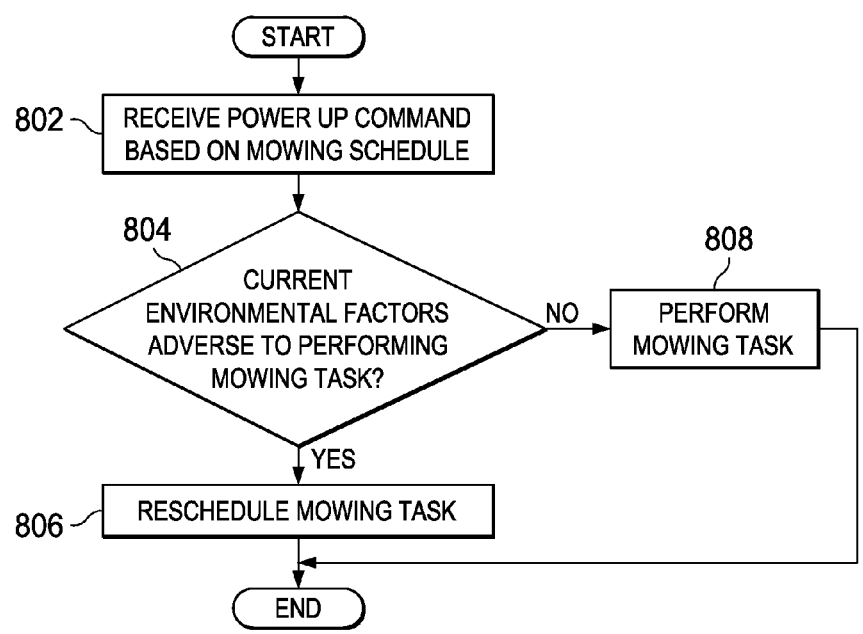
FIG. 8 is a flowchart illustrating an exemplary process for rescheduling a mowing task based on adverse environmental factors in accordance with an illustrative embodiment.

With reference now to FIG. 8, a flowchart illustrating an exemplary process for rescheduling a mowing task based on adverse environmental factors is shown in accordance with an illustrative embodiment. The process shown in FIG. 8 may be implemented in a mowing system, such as mowing system 300 in FIG. 3.

The process begins when the mowing system receives a power up command based on a mowing schedule, such as mowing schedule 338 in FIG. 3 (step 802). Then, the mowing system utilizes a sensor system, such as sensor system 400 in FIG. 4, to make a determination as to whether current environmental factors are adverse to performing a mowing task (step 804). The sensor system may use a rain sensor, such as rain sensor 408 in FIG. 4, along with one or more other sensors to make this determination.

If the current environmental factors are adverse to performing a mowing task, yes output of step 804, then the mowing system uses a machine controller, such as machine controller 306 in FIG. 3, to reschedule the mowing task for a later time (step 806). Rescheduling for a later time may, for example, include rescheduling the task on that same day in one or more hours or rescheduling the task for the next day at the same time. However, it should be noted that rescheduling the mowing task may also include canceling the currently scheduled mowing task altogether and then waiting until the next regularly scheduled mowing task. The process terminates thereafter.

If the current environmental factors are not adverse to performing a mowing task, no output of step 804, then the mowing system uses a service robot mower, such as service robot mower 302 in FIG. 3, to perform the mowing task (step 808). The process terminates thereafter.

Thus, illustrative embodiments provide a method and system for adaptive mowing task scheduling of a mobile service robot mower. The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method performed by a controller for scheduling mowing tasks by a robotic mower, the method comprising:
   the controller determining an estimated height of grass cut by the robotic mower for a predetermined number of past mowing tasks;
   the controller comparing the estimated height of grass cut with a predicted height of grass in an operating environment for the robotic mower;
   the controller adjusting a mowing schedule for the robotic mower by decreasing a time between mowing tasks in response to the estimated height of grass cut being greater than the predicted height of grass; and
   the controller adjusting the mowing schedule for the robotic mower by increasing the time between mowing tasks in response to the estimated height of grass cut being less than the predicted height of grass.

2. The method of claim 1 further comprising:
   estimating a height of grass cut during a current mowing task; and
   recording the height of grass cut estimate for the current mowing task in a storage device.

3. The method of claim 1 further comprising:
   mapping received environmental factors to past times in association with intervals between scheduled mowing tasks;
   receiving current and future predictions of environmental factors; and
   adjusting the mowing schedule for the robotic mower based on estimated grass height to account for the environmental factors.

4. The method of claim 1 further comprising:
   receiving a power up command based on the mowing schedule for the robotic mower;
   determining whether current environmental factors are adverse to performing a mowing task; and
   responsive to determining that the current environmental factors are adverse to performing the mowing task, rescheduling the mowing task.

5. The method of claim 1 further comprising:
   returning the robotic mower to a charging station, wherein a return to charging station behavior is activated at a first predetermined percentage charge level remaining in a rechargeable power source in the robotic mower, and wherein a target percentage charge level remaining in the rechargeable power source at return to the charging station is set at a second predetermined percentage charge level; and wherein an actual percentage charge level remaining in the rechargeable power source at return to the charging station is determined; and wherein the first predetermined percentage charge level for activating the return to charging station behavior is increased in response to the actual percentage charge level remaining in the rechargeable power source at return to the charging station being less than the target percentage charge level remaining in the rechargeable power source at return to the charging station.

6. The method of claim 5, wherein ambient air temperature data is used to adjust the first predetermined percentage charge level for activating the return to charging station behavior.

7. The method of claim 5, wherein topographic data regarding an operating environment for the robotic mower is used to adjust the first predetermined percentage charge level for activating the return to charging station behavior.

8. The method of claim 1, wherein the robotic mower is aware of an irrigation system watering schedule; and wherein the mowing schedule is adjusted in response to changes to the irrigation system watering schedule.

9. The method of claim 1, wherein behavioral patterns of a user are used to adjust the mowing schedule; and wherein the behavioral patterns of the user are retrieved from an electronic calendar application.

10. The method of claim 1, wherein the predicted height of grass is based on a grass growth model, and wherein the predicted height of grass is calculated prior to a mowing task.

11. The method of claim 1, wherein a boundary sensor that is used to identify a boundary wire of an operating environment for the robotic mower is also used to measure soil moisture.

12. The method of claim 1, wherein determining the estimated height of grass cut by the robotic mower is based on a power usage of a cutting unit motor in the robotic mower.

13. The method of claim 1, wherein determining the estimated height of grass cut by the robotic mower is based on data obtained by at least one of a grass height sensor and a structured light sensor.

14. A robotic mower comprising:
a cutting unit motor;
a propulsion system;
a steering system;
a braking system;
a sensor system for collecting data regarding an operating environment for the robotic mower;
a monitoring system that monitors a power usage of the cutting unit motor; and
a machine controller coupled to the cutting unit motor, the propulsion system, the steering system, the braking system, the sensor system, and the monitoring system; wherein the machine controller determines an estimated height of grass cut by the robotic mower for a predetermined number of past mowing tasks, compares the estimated height of grass cut with a predicted height of grass in an operating environment for the robotic mower, adjusts a mowing schedule for the robotic mower by decreasing a time between mowing tasks in response to the estimated height of grass cut being greater than the predicted height of grass, and adjusts the mowing schedule for the robotic mower by increasing the time between mowing tasks in response to the estimated height of grass cut being less than the predicted height of grass.

15. The robotic mower of claim 14, wherein the machine controller estimates a height of grass cut during a current mowing task and records the height of grass cut estimate for the current mowing task in a storage device.

16. The robotic mower of claim 14, wherein the machine controller maps received environmental factors to past times in association with intervals between scheduled mowing tasks, receives current and future predictions of environmental factors, and adjusts the mowing schedule for the robotic mower based on estimated grass height to account for the environmental factors.

17. The robotic mower of claim 14, wherein the machine controller receives a power up command based on the mowing schedule for the robotic mower, determines whether current environmental factors are adverse to performing a mowing task, and reschedules the mowing task in response to determining that the current environmental factors are adverse to performing the mowing task.

18. The robotic mower of claim 14, wherein the machine controller returns the robotic mower to a charging station; and wherein the machine controller activates a return to charging station behavior at a first predetermined percentage charge level remaining in a rechargeable power source in the robotic mower; and wherein the machine controller sets a target percentage charge level remaining in the rechargeable power source at return to the charging station at a second predetermined percentage charge level; and wherein the machine controller determines an actual percentage charge level remaining in the rechargeable power source at return to the charging station; and wherein the machine controller increases the first predetermined percentage charge level for activating the return to charging station behavior in response to the actual percentage charge level remaining in the rechargeable power source at return to the charging station being less than the target percentage charge level remaining in the rechargeable power source at return to the charging station.

19. The robotic mower of claim 18, wherein the machine controller uses ambient air temperature data to adjust the first predetermined percentage charge level for activating the return to charging station behavior.

20. The robotic mower of claim 18, wherein the machine controller uses topographic data regarding the operating environment for the robotic mower to adjust the first predetermined percentage charge level for activating the return to charging station behavior.

* * * * *